United States Patent
Krimer

(10) Patent No.: US 12,321,260 B1
(45) Date of Patent: Jun. 3, 2025

(54) MEMORY SPACE ASSIGNMENT FOR MEMORY CONTROLLERS IN NON-POWER OF TWO QUANTITIES

(71) Applicant: Google LLC, Mountain View, CA (US)

(72) Inventor: Evgeni Krimer, Haifa (IL)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/237,602

(22) Filed: Aug. 24, 2023

(51) Int. Cl.
G06F 12/00 (2006.01)
G06F 12/02 (2006.01)

(52) U.S. Cl.
CPC ................. G06F 12/023 (2013.01)

(58) Field of Classification Search
CPC ..... G06F 12/023; G06F 3/0604; G06F 3/0638
See application file for complete search history.

(56) References Cited

U.S. PATENT DOCUMENTS

| | | | | |
|---|---|---|---|---|
| 2004/0073765 A1* | 4/2004 | Arimilli | ............ | G06F 12/0653 711/202 |
| 2011/0029730 A1 | 2/2011 | Durocher et al. | | |
| 2012/0054375 A1* | 3/2012 | Arndt | .............. | G06F 11/3485 711/3 |
| 2015/0095661 A1* | 4/2015 | Sell | ............ | G06F 12/1408 713/193 |
| 2022/0404977 A1 | 12/2022 | Ito et al. | | |
| 2023/0367510 A1* | 11/2023 | Fishwick | ............. | G06F 3/0659 |
| 2024/0103732 A1* | 3/2024 | Chen | .............. | G06F 3/0646 |

OTHER PUBLICATIONS

Extended European Search Report for European Patent Application No. 24195030.2 dated Dec. 18, 2024. 7 pages.

* cited by examiner

*Primary Examiner* — John A Lane
(74) *Attorney, Agent, or Firm* — Lerner David LLP

(57) ABSTRACT

A system including a memory space that is accessible for reading or writing data, N memory controllers, N being an integer that is greater than one and is not a power of two, and one or more processors configured to assign addresses of the memory space to M regions and map each of the N memory controllers to a subset of the M regions. Each subset of the M regions may include exactly J regions, J being less than M and a power of two. More than one memory controller may be mapped to each region of the plurality of M regions. The same number of memory controllers may be mapped to each region of the M regions.

20 Claims, 5 Drawing Sheets

FIG. 3

MEMORY SPACE ASSIGNMENT FOR MEMORY CONTROLLERS IN NON-POWER OF TWO QUANTITIES

BACKGROUND

Modern computing systems often utilize multiple memory controllers connected to a memory space for data and code storage and access. The memory controllers are responsible for performing memory access operations, such as instructing read and write operations within the memory space.

Spreading the data over the memory space using multiple memory controllers has the benefit of increasing overall access bandwidth. In this regard, many memory access requests may be sent to memory in parallel, and the requests may be handled simultaneously by multiple memory controllers. However, because the memory controllers tend to access memory locations that are close to one another in time and space, access patterns can lead to increased latency for the system, as only one or a few memory controllers may handle the memory access requests. To address this issue, memory controllers may be specially configured to spread memory access requests evenly across the memory space, thereby reducing the latency and avoiding the locality issues. For instance, the memory controllers may be programmed to interleave data across the memory space according to a specialized pattern that evenly distributes the memory access operations.

Specialized memory access patterns, such as those for memory interleaving, are specifically designed for implementation with only certain numbers of memory controllers, particularly a power of two such as 2, 4, 8, 16, and so on. However, if a different number of memory controllers, such as 10, 12 or 14 memory controllers, are used, the specialized memory access patterns used for the power of two memory controllers would no longer spread memory access requests across the memory space evenly and could even create new latency issues or locality problems. Stated another way, the current solutions for distributing memory access requests across a plurality of memory controllers significantly limit the options for the memory controllers that may be included in the system, which can lead to inefficiencies in memory storage and access for the computing system.

SUMMARY

The present disclosure provides an improved memory access technique that increases access efficiency while using any number of memory controllers.

One aspect of the disclosure is directed to a system that includes a memory space that is accessible for reading or writing data; a plurality of N memory controllers, N being an integer that is greater than one and is not a power of two; and one or more processors configured to: assign addresses of the memory space to a plurality of M regions; and map each of the plurality of N memory controllers to a subset of the plurality of M regions.

In some examples, each subset of the plurality of M regions may include exactly J regions, J being less than M and a power of two. In some examples, J may be the largest value that is a power of two and that is less than M.

In some examples, the one or more processors may be configured to map more than one memory controller to each region of the plurality of M regions, and map the same number of memory controllers to each region of the plurality of M regions.

In some examples, N is equal to 5, M is equal to 5, and J is equal to 4. In other examples, N is equal to 6, M is equal to 6, and J is equal to 4.

In some examples, the memory space may include a plurality of blocks of system level cache memory associated with a plurality of core processing units.

In some examples, the one or more processors may be configured to: divide both the memory controllers and the system level cache memory into a plurality of non-overlapping clusters; assign memory addresses to the plurality of clusters; and for at least one cluster, assign addresses of the memory space of the cluster to the plurality of M regions and map each of the plurality of N memory controllers to a subset of the plurality of M regions within the cluster.

In some examples, the one or more processors may be configured to: assign the memory addresses to the cluster using a power of two hashing algorithm; and within the at least one cluster, determine to which system level cache blocks of the cluster the memory addresses are assigned using a non-power of two hashing algorithm.

In some examples, the one or more processors may be configured to control a granularity of cluster alternation for address assignment among the plurality of clusters using address masking.

In some examples, the N memory controllers may be included in a chip.

Another aspect of the disclosure is directed to a method including: assigning, by one or more processors, addresses of a memory space that is accessible for reading or writing data to a plurality of M regions; and mapping, by the one or more processors, each of a plurality of N memory controllers to a subset of the plurality of M regions, wherein N is an integer that is greater than one and is not a power of two.

In some examples, each subset of the plurality of M regions may include exactly J regions, J being less than M and a power of two. In some examples, J may be the largest value that is a power of two and that is less than M.

In some examples, more than one memory controller may be mapped to each region of the plurality of M regions, and the same number of memory controllers may be mapped to each region of the plurality of M regions.

In some examples, N is equal to 5, M is equal to 5, and J is equal to 4. In other examples, N is equal to 6, M is equal to 6, and J is equal to 4.

In some examples, assigning addresses of the memory space may include assigning blocks of system level cache memory to the plurality of M regions.

In some examples, the method may further include dividing, by the one or more processors, both the memory controllers and the system level cache into a plurality of non-overlapping clusters; assigning, by the one or more processors, the memory addresses to the plurality of clusters; and for at least one cluster, assigning, by the one or more processors, addresses of the memory space of the cluster to the plurality of M regions and mapping each of the plurality of N memory controllers to a subset of the plurality of M regions within the cluster.

In some examples, the method may further include assigning, by the one or more processors, the memory addresses to the cluster using a power of two hashing algorithm; and within the at least one cluster, determining, by the one or more processors, to which system level cache blocks of the cluster the memory addresses are assigned using a non-power of two hashing algorithm.

In some examples, the method may further include controlling, by the one or more processors, a granularity of cluster alternation for address assignment among the plurality of clusters using address masking.

In some examples, the method may further include controlling, by the one or more processors, a granularity of address assignments within cache of the memory space using address masking.

BRIEF DESCRIPTION OF THE DRAWINGS

FIG. 3 is a diagram illustrating memory space allocation in accordance with an aspect of the present disclosure.

DETAILED DESCRIPTION

Overview

Increasing access efficiency while using any number of memory controllers may be accomplished by dividing memory addresses that are mapped to the memory controllers into a predetermined number of regions. Then, each region of the memory addresses is associated with a particular subset of memory controllers containing a number of memory controllers that is a power of two. The subsets of memory controllers may overlap, meaning that the same memory controller may be used for multiple regions. By setting up the number of memory controllers per region appropriately, it can be ensured that each memory controller appears in the same number of regions as the other memory controllers, and that each region is mapped to the same number of memory controllers. In other words, the memory controllers continue to interleave data across the memory space according to specialized patterns that require a power of two number of memory controllers, but now each memory controller is utilized within multiple ones of these specialized patterns in a way that allows for each memory controller to be assigned to the same number of specialized patterns as the other memory controllers.

For example, in a system having 10 memory controllers and memory addresses that are divided into 5 regions, each region of memory addresses may be mapped to 4 memory controllers or 8 memory controllers. In the case of 4 memory controllers per region, each memory controller would be mapped to 2 of the 5 regions. Alternatively, in the case of 8 memory controllers per region, each memory controller would be mapped to 4 of the 5 regions. Considerations as to the preferred number of memory controllers mapped to each region may vary between computing systems. In some instances, it may be preferable to pick the highest power of two that does not exceed the total number of memory controllers.

The systems and techniques presented in this disclosure provide reduced latency and better distribution of data access operations when using a non-power of two number of memory controllers. This leads to an overall improvement in the efficiency of the memory access operations in such non-power of two configurations, thereby opening up possibilities for new combinations and arrangements of memory controllers. Increasing the available options of memory controllers without affecting efficiency can facilitate better customization of the computing systems, which in turn may reduce the overall waste and total costs for building and maintaining these computing systems.

Example Systems

Figure 1:
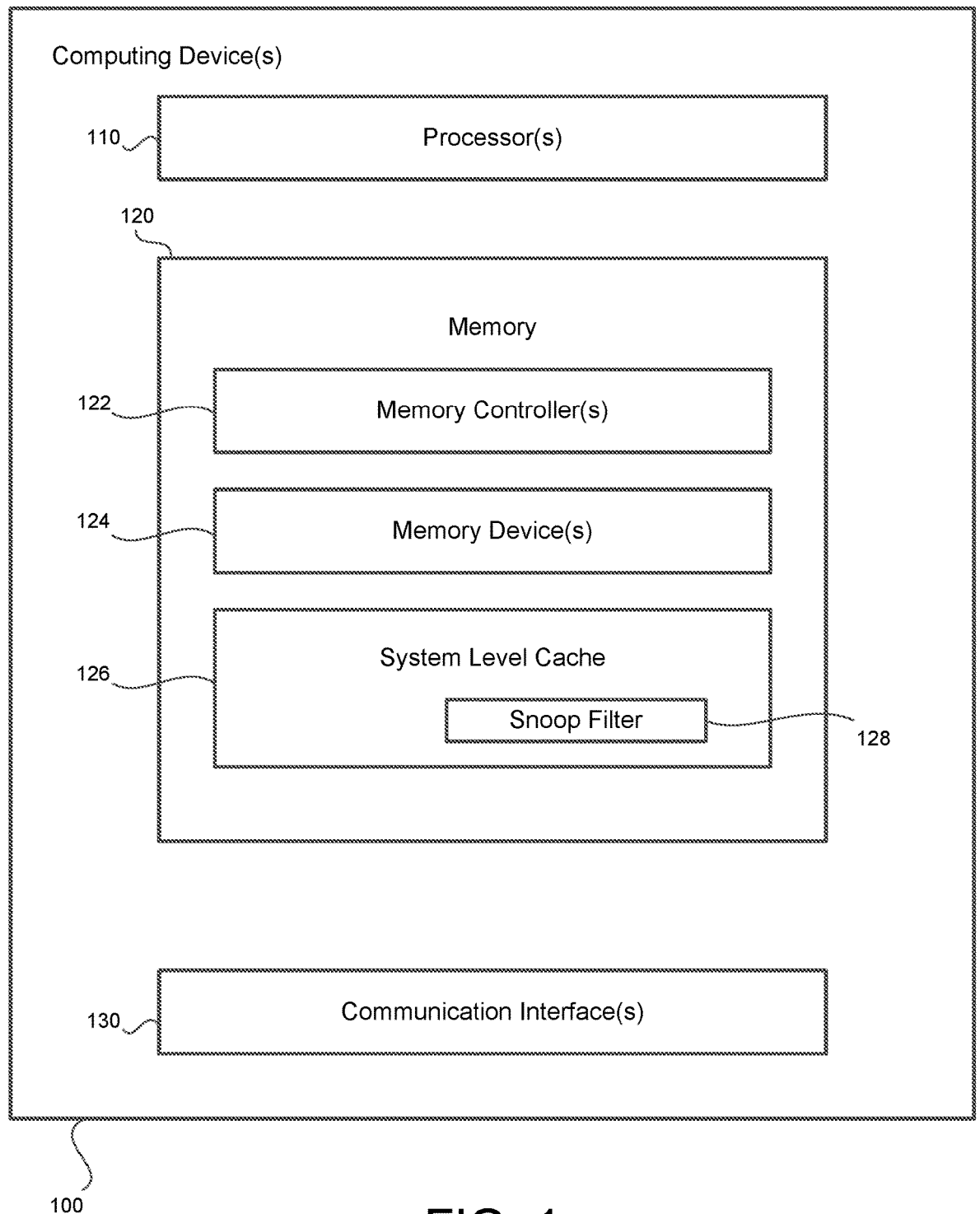
FIG. 1 is a block diagram of an example system in accordance with an aspect of the present disclosure.

FIG. 1 is a block diagram illustrating an example system including one or more computing devices 100. The computing devices 100 may include one or more processors 110, memory 120, and one or more communication interfaces 130 for transmitting and receiving information, such as data or code representing guidelines or instructions for writing, accessing or processing the data. In some examples, the computing devices 100 may include a single-core or multi-core chip. In some examples, the computing devices 100 may include both the single-core or multi-core chip as well as further devices connected to the chip, such as one or more memory devices 124.

The one or more processors 110 may include a CPU core in communication with the memory 120. The core may be a microprocessor residing on a chip, a multi-core processor, or any other known processor, e.g., a GPU, FPGA, ASIC such as a TPU, etc. While only one block is shown in FIG. 1, any number of CPU cores may be included.

The memory 120 may include a combination of memory controllers 122, memory devices 124 and system level cache 126 for handling incoming memory access requests, such as read or write requests. The memory controllers 122 may be configured to communicate with the memory devices 124 to access the memory space corresponding to the requested data. The memory devices 124 may include any one or more types of memory, such as read-only memory, random access memory, removable storage media, cache, registers, or the like. For instance, the memory devices may include dynamic random access memory (DRAM) modules, which may or may not include a one or more dual in-line memory modules (DIMMs). Other examples of the memory devices 124 may include high-bandwidth memory (HBM). The memory modules may be connected to the processor 110 and other components of the computing devices 100.

Figure 2:
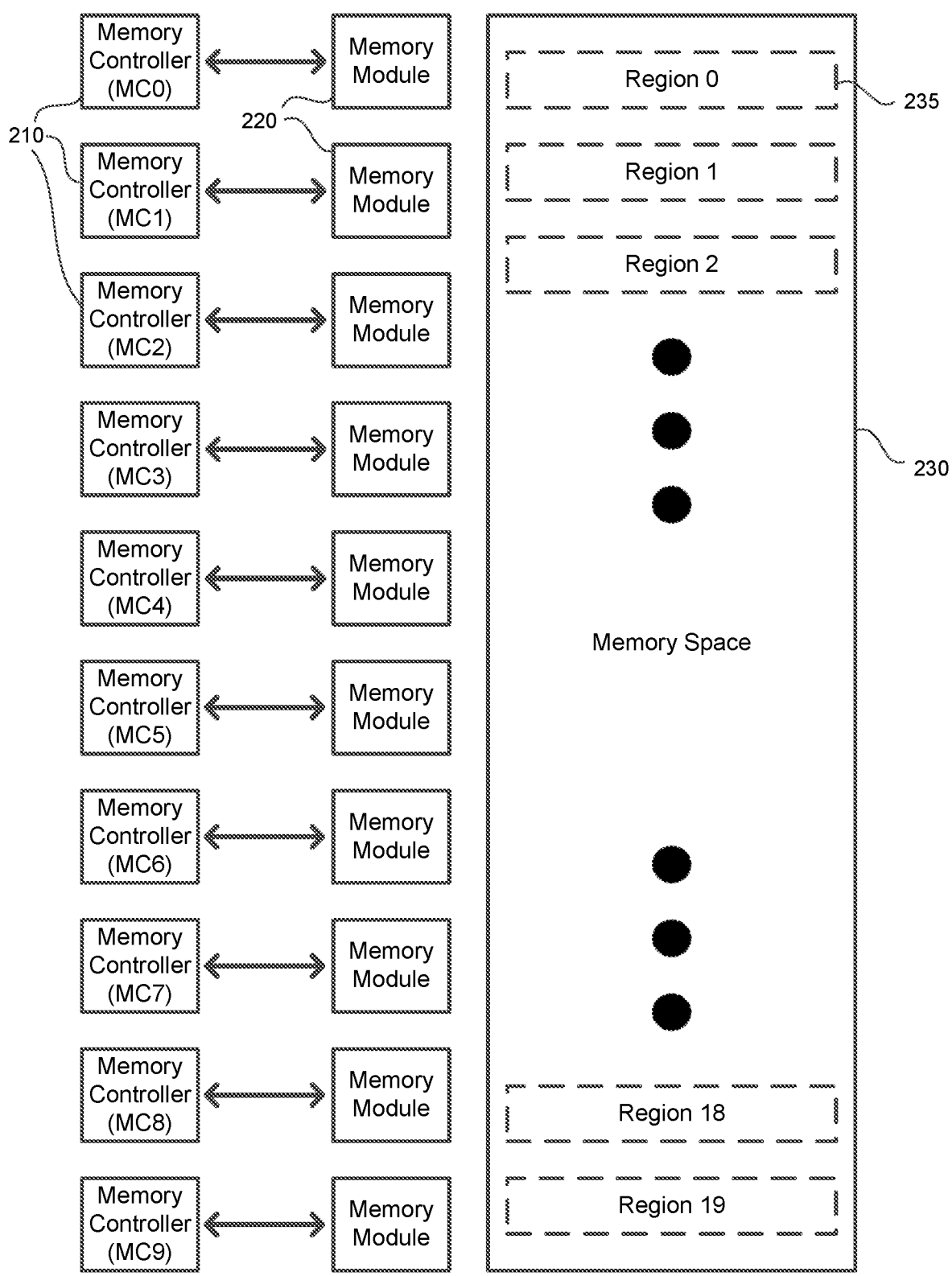
FIG. 2 is a block diagram of an example arrangement of memory in accordance with an aspect of the present disclosure.

FIG. 2 is a block diagram illustrating an example arrangement of memory controllers and memory devices. In the example of FIG. 2, a system including 10 memory controllers 210 labelled MC0 through MC9 is shown. In other examples, a different number of memory controllers may be included. For purposes of the present disclosure, it is assumed that the number of memory controllers is not a power of two, meaning that the number of memory controllers is not 2, 4, 8, 16 and so on.

Each memory controller 210 is connected to a respective memory device or memory module 220 for accessing a memory space 230. The memory space 230 itself may be divided into and include multiple regions 235. In the example of FIG. 2, there are 20 regions labelled Region 0 through Region 19. As described in greater detail herein, each region may be mapped from multiple ones of the memory devices 220 and, by extension, multiple ones of the memory controllers 210 (MC0-MC9). Thus, more than one memory device 220 may be used to access a particular address range within the memory space 230, although not all memory devices 220 can be used to access that particular address range.

In some examples, the arrangement of the memory controllers 210 between the requesting nodes and memory devices 220 may operate as a coherent hub interface (CHI) in which a cache of the shared memory space 230 is consistent for all requesting nodes.

Returning to FIG. 1, in some examples, the memory 120 may further include one or more blocks of system-level cache (SLC) 126, also known as last-level cache (LLC). In the example of FIG. 1, a single block of SLC 126 is shown, although in other examples, multiple blocks of SLC may be included in the system 100. Also, in the example of FIG. 1, the block of SLC 126 is shown as including a snoop filter 128 configured to monitor access requests to the shared memory of the memory space layer 230 and maintain coherency among the SLC blocks 126 monitoring the memory space layer 230. In operation, the SLC 126 may receive a memory access request from a requesting node and attempt to service the memory access request. If the requested data is not present in the SLC 126 or in other nodes according to the snoop filter 128, then the request may be communicated to a memory controller 122, 210 corresponding to a memory device 124, 220 that can service the memory access request.

Regarding the mapping of addresses between the memory controllers 210 and memory space 230 layer shown in FIG. 2, the one or more processors 110 of FIG. 1 may be configured to arrange or control this mapping of addresses between the memory space layer 230 and the memory controllers 220. Mapping addresses to the memory controllers may be accomplished by the one or more processors 110 first dividing the memory space layer 230 of the memory into a certain number of regions, selecting a certain number of bits of the addresses, and applying a hash function to the selected bits of the addresses followed by a modulo of the hashed value, whereby the modulo corresponds to a certain number of memory controllers to which the addresses of the region are assigned. In some examples, the hash function used for assignment of the memory addresses may be a power of two hashing algorithm. This process can spread the mapping of addresses evenly among the memory controllers, particularly when the number of regions of memory addresses being assigned is a power of two. When the total number of memory controllers is a power of two, this mapping can be simple as the total number of regions may be selected to be a power of two, including one, and each region assigned to all of the memory controllers. By comparison, when the total number of memory controllers in the memory control layer is not a power of two, the total number of regions into which the addresses are divided may be selected to be a different number that is not a power of two so as to distribute the addresses evenly among the non-power of two memory controllers.

Figure 3:
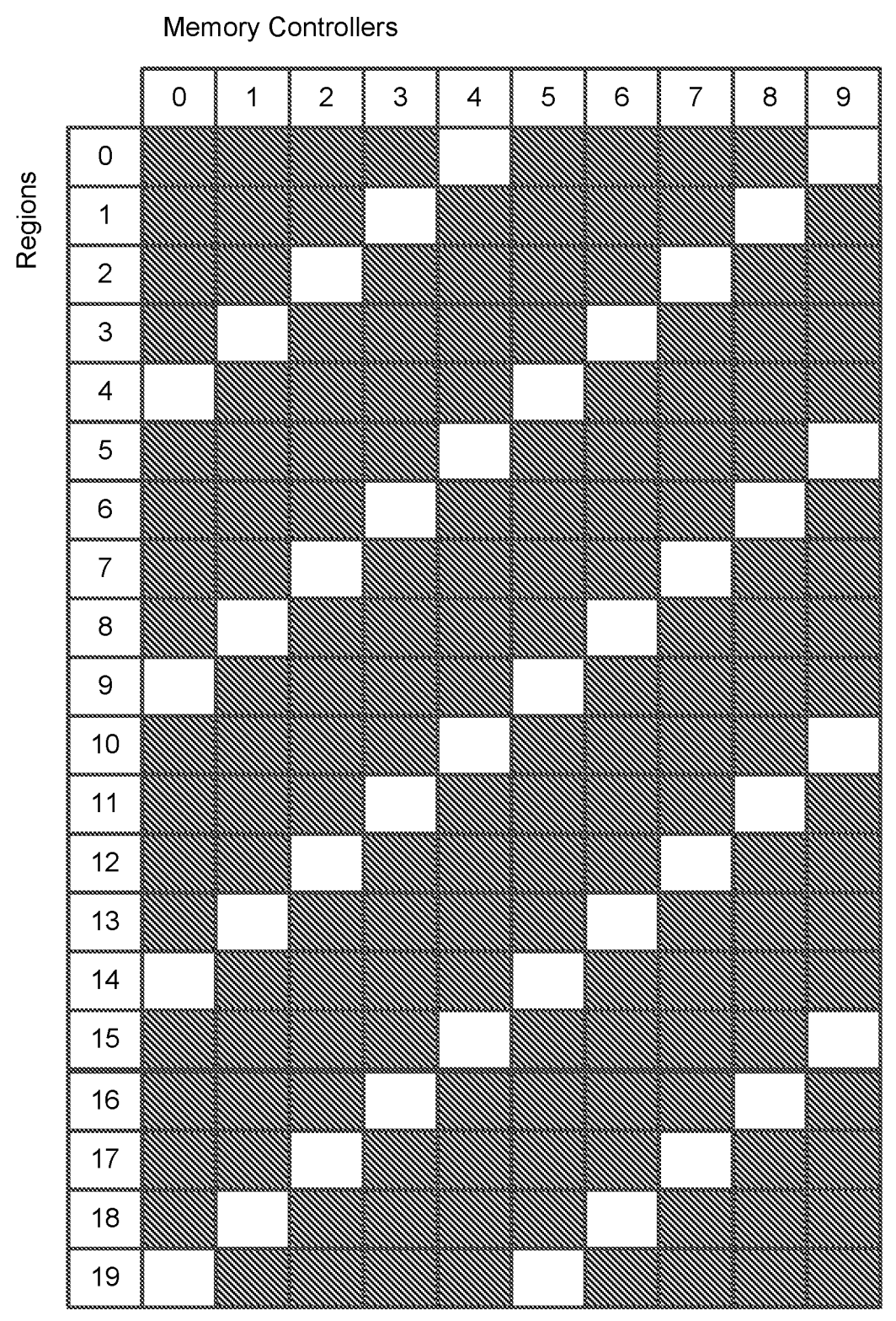

An example of a non-power of two distribution is shown in FIG. 3, in which addresses from 20 regions of a memory space (labeled 0-19) are mapped to 10 memory controllers (labeled 0-9). In the example of FIG. 3, each region of addresses is mapped to 8 out of 10 of the memory controllers, whereby mapping between a memory controller and a region is indicated by a shaded box. For instance, region 0 is mapped to memory controllers, 0, 1, 2, 3, 5, 6, 7 and 8. For further example, region 1 is mapped to memory controllers 0, 1, 2, 4, 5, 6, 7 and 9. As can be seen from FIG. 3, each region 0-19 is mapped to exactly 8 out of the 10 controllers 0-9. Furthermore, the mappings are arranged such that each memory controller is mapped to the same number of regions, which in this example is 16 regions.

In some examples, creating the mappings shown in FIG. 3 may be accomplished using a masking algorithm, whereby instead of instructing the memory controllers as to which regions are mapped, each region that is not mapped to a respective memory controller is masked for that memory controller. In other examples, an algorithm may identify the specific regions that are mapped to the memory controllers without requiring masking of the unassigned regions, such as by applying a non-power of two hashing algorithm to address bits of the addresses in each region. In the case of non-power of two hashing, the hash table size may be not a power of two, which is known to have the effect of providing more uniform distribution and reducing collisions during hashing. In such examples, address masking may be used to control the granularity of address mappings within cache of the memory space, meaning that instead of alternating cachelines being mapped to different regions, multiple cachelines such as 2 cachelines, 4 cachelines, 8 cachelines, 16 cachelines, 32 cachelines, and so on, can be alternatingly mapped to the different regions.

Selecting the number of regions of memory and the number of regions mapped to each memory controller may be performed by the one or more processors 110 based on predefined rules or guidelines. One rule is that the number of regions that are mapped to each memory controller should be a power of two. In some instances, that number may be selected to be the largest value that is a power of two and that is less than the total number of regions of the memory space. For instance, in the example of FIG. 3, the total number of regions is 20 and the number of regions mapped to each memory controller is 16, whereby 16 is the largest power of two number that is less than 20. In other instances, a smaller value may be used, such as mapping 8 or 4 regions to each memory controller of the example of FIG. 3.

Also, in some examples, the number of regions may be equal to the number of memory controllers, so that it is ensured that each memory controller is mapped to the same number of regions. For example, if there are 5 regions and 5 memory controllers, each of the 5 memory controllers can be mapped to 4 out of 5 of the regions, leaving each region accessible to exactly 4 memory controllers. Likewise, in a different example, if there are 15 regions and 15 memory controllers, each of the 15 memory controllers can be mapped to 8 out of the 15 regions, leaving each region accessible to exactly 8 memory controllers. However, as shown in FIG. 3, in which there are 20 regions and 10 memory controllers, it is not always required for the total number of regions and the total number of memory controllers to equal one another.

In the example of FIGS. 1 and 2, a single group of memory controllers MC0-MC9 are shown as being divided evenly among the memory devices of a single memory space. However, in other example systems, the memory space itself may be subdivided into respective memory space clusters, which may or may not be contiguous, whereby memory addresses of the memory space may be addressed to different ones of the respective memory space clusters. In such an example, the respective memory space clusters may be controlled by corresponding memory controller clusters, whereby the memory controllers for one memory controller cluster are kept separate from the memory controllers of the other memory controller clusters.

Figure 4:
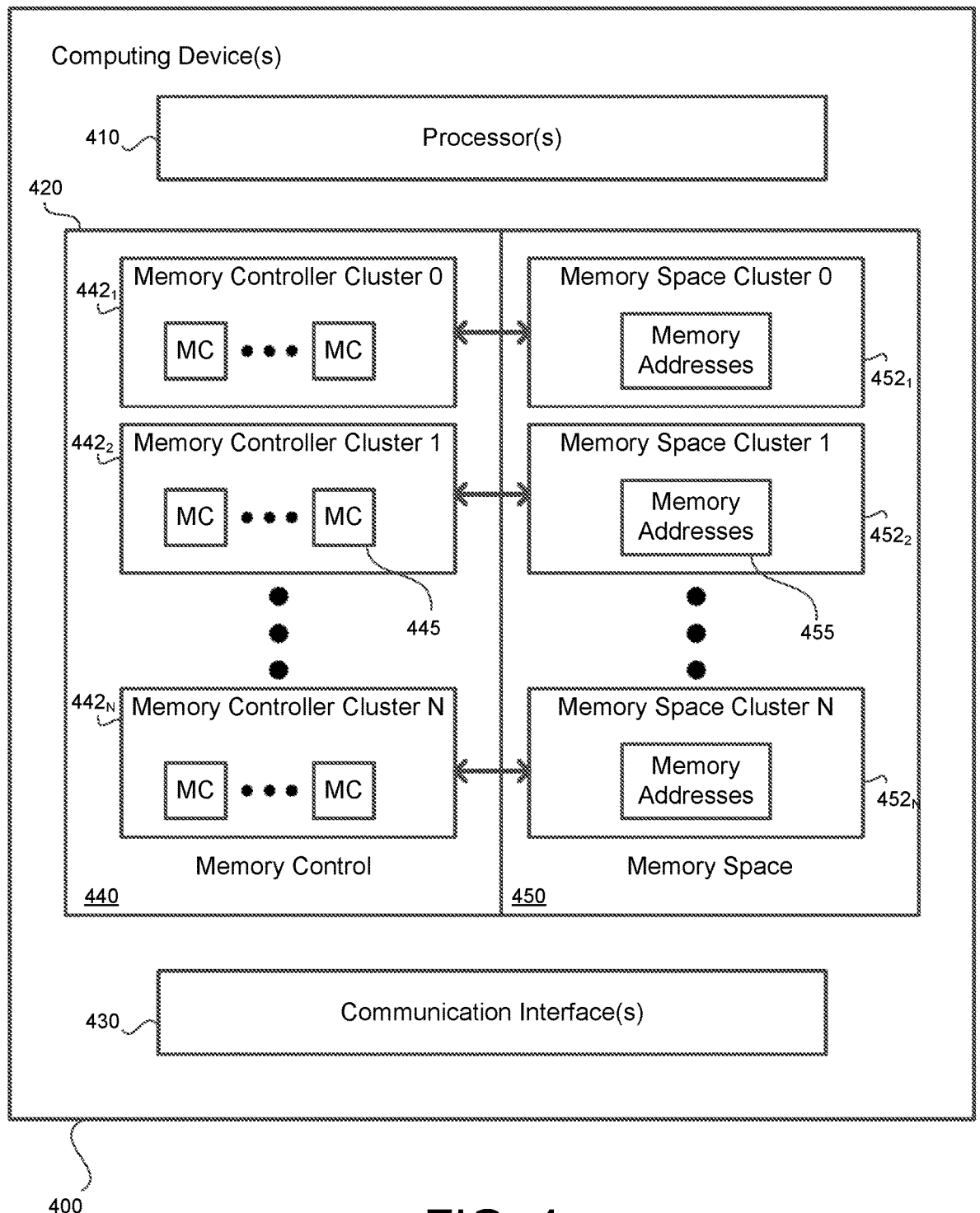
FIG. 4 is a block diagram of another example system in accordance with an aspect of the present disclosure.

Such an example system is shown in FIG. 4. Like the example system of FIGS. 1 and 2, the example system of FIG. 4, includes one or more computing devices 400 having one or more processors 410, memory 420, and communication interfaces 430 for communication with other systems or users of the system. Also, like the memory 120 of the system of FIGS. 1 and 2, the memory 420 of the system of FIG. 4 may include each of memory controllers, memory devices and a memory space. The system of FIG. 4 differs from that of FIGS. 1 and 2 in that the memory control 440 components and memory space 450 components are divided into multiple clusters, whereby each of the memory controllers (MC) 445 is mapped to a different respective memory controller cluster $442_1$-$442_N$, and the memory addresses 455 are mapped to a different respective memory space clusters $452_1$-$452_N$ linked to a corresponding one of the memory controller clusters $442_1$-$442_N$. Mapping may involve assigning each of the memory addresses 455 to its different respective memory space cluster $452_1$-$452_N$ using a power of two hashing algorithm.

Although the memory devices are not shown in FIG. 4, it should be understood that each memory controller included in each of the memory control clusters $442_1$-$442_N$ may communicate with a corresponding memory device to access the memory addresses to which it is mapped in its corresponding memory space cluster $452_1$-$452_N$. As such, each pair of memory control clusters $442_1$-$442_N$ and memory space clusters $452_1$-$452_N$ may also include its own respective memory devices.

Regarding the clustering of memory controllers into memory controller clusters, the number of memory controller clusters may vary from one system to another depending on several factors, including but not limited to the total number of memory controllers, locality of the memory controllers relative to one another, and locality of the memory devices included in the memory space relative to one another.

While in some cases a higher number of memory controllers may correlate to a higher number of memory controller clusters, it should be appreciated that this is not the only way that the total number of memory controllers may factor into the number of memory controller clusters. For instance, the number of memory controllers per memory controller cluster may be chosen to facilitate the efficient division of memory controllers into regions as described in connection to FIG. 2. To illustrate, if the total number of memory controllers is 54, then the number of memory controller clusters may be 3 (18 memory controllers per cluster), 6 (9 memory controllers per cluster) or 9 (6 memory controllers per cluster). In clusters including 18 memory controllers, the number of regions accessed by the memory controllers may be either 9 (e.g., with each memory controller having access to 8 out of 9 regions) or 18 (e.g., with each memory controller having access to 16 out of 18 regions). In clusters including 9 memory controllers, the number of regions accessed by the memory controllers may be limited to 9 (e.g., with each memory controller having access to 8 out of 9 regions). In clusters including 6 memory controllers, the number of regions accessed by the memory controllers may be limited to 6 (e.g., with each memory controller having access to 4 out of 6 regions). Since the preferred total number of regions for a memory space cluster may vary from one system to another, preferences for a certain number of memory controllers per memory controller cluster may similarly vary from one system to another.

Mapping the memory space clusters $452_1$-$452_N$ associated with the respective memory controller clusters $442_1$-$442_N$ to the memory controllers 445 may involve hashing addresses of the memory space among the memory space clusters $452_1$-$452_N$. In an example in which a size of a given memory space cluster $452_1$-$452_N$ is equal to a power of two such as 32 GB, 64 GB, and so on, a hashing of address bits may be used to map a specific address to the given memory cluster. Address bit masking may be used to control the granularity at which the hashing is performed, meaning that instead of alternating cachelines being associated with different clusters, multiple cachelines such as 2 cachelines, 4 cachelines, 8 cachelines, 16 cachelines, 32 cachelines, and so on, can be alternatingly associated with the different clusters.

Example Methods

Figure 5:
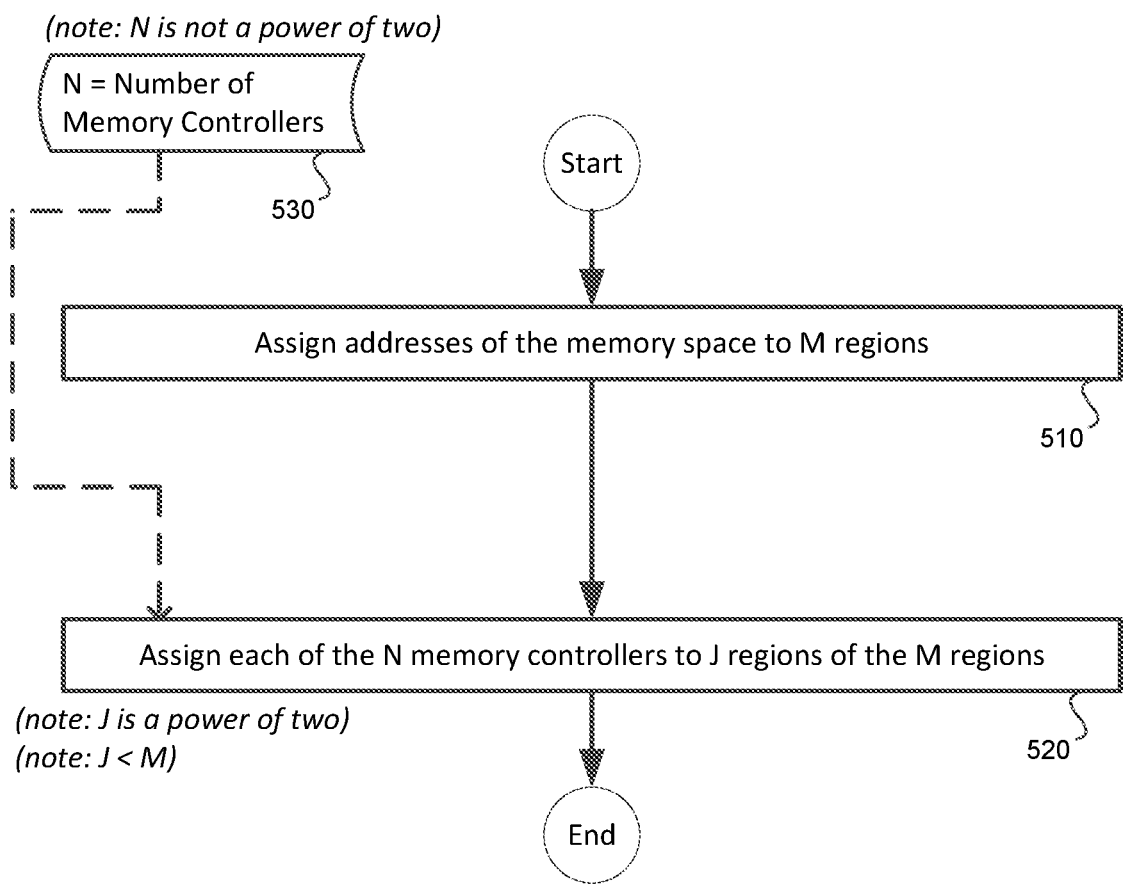
FIG. 5 is a flow diagram of an example process in accordance with an aspect of the present disclosure.

FIG. 5 is a flow diagram illustrating an example process 500 for mapping memory addresses to memory controllers in accordance with aspects of the present disclosure. The process 500 may be executed by one or more processors, such as the one or more processors of the computing device(s) of FIG. 1. It should be understood that in at least some cases, while the one or more processors are used to perform the mapping, once the mapping is created, memory access requests may then be handled without the one or more processors, such as at the SLC itself.

At block 510, the one or more processors may assign addresses of the memory space to a number of regions, referred to as "M" regions. Each address of the memory space may belong to only one region. The number of regions "M" may be based on various factors such as the number of the size of the memory space, the number of memory controllers controlling the memory space, referred to herein as "N," and so on.

At block 520, the one or more processors may map each of the memory controllers to a subset of the M regions, meaning that those memory controllers mapped to a certain region can access the addresses associated with that region. The number of regions mapped to each memory controller, referred to herein as "J," may be the same for each memory controller. Stated another way, each memory controller may have access to the same amount of space in the memory space. Furthermore, it should be appreciated that while the value of J is necessarily lower than the value M, the value J does not have to be a factor of M, since each region can be mapped to multiple memory controllers. One requirement for the value of J is that it should be a power of two so that hashing of the memory space across the controllers is efficiently spread among the memory controllers to avoid latency issues or locality problems.

In the example of FIG. 5, the process may receive as an input 530 the predetermined number of memory controllers "N." Also, in the example of FIG. 5, the number of regions "M" may also be predetermined before the process 500. However, in other examples, the value of "M" may be determined as part of block 510. Such a determination may be based on the value of "N" as well as other factors such as the size of the memory space. In a similar vein, in the example of FIG. 5, the number of regions "J" to which each memory controller is mapped may also be predetermined before the process 500. However, in other examples, the value of "J" may be determined as part of block 520. Such a determination may be based on the values of "M" and "N" as well as other factors such as the size of the memory space.

The systems and methods described herein may be used to facilitate memory access requests across multiple memory controllers without degrading mesh bandwidth, even when the total number of memory controllers is not a power of two. This may be particularly advantageous for chip developers seeking ways to increase the number of memory controllers on a chip without having to raise the total number by a factor of two. Stated another way, a chip may be designed with any number of memory controllers, regardless of whether the number of a power of two, thereby leading to greater chip design flexibility without degrading overall chip performance or degrading performance of some memory elements of the chip.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
a memory space that is accessible for reading or writing data;
a plurality of N memory controllers, wherein N is an integer that is greater than one and is not a power of two; and
one or more processors configured to:
assign addresses of the memory space to a plurality of M regions, wherein M is an integer that is greater than one; and
map each of the plurality of N memory controllers to a different respective subset of the plurality of M regions, wherein each of the N memory controllers is mapped to multiple regions of the M regions and each of the M regions is mapped to multiple memory controllers of the N memory controllers.

2. The system of claim 1, wherein each subset of the plurality of M regions includes exactly J regions, wherein J is less than M and is a power of two.

3. The system of claim 2, wherein J is the largest value that is a power of two and that is less than M.

4. The system of claim 2, wherein the one or more processors are configured to map more than one memory controller to each region of the plurality of M regions, and map the same number of memory controllers to each region of the plurality of M regions.

5. The system of claim 2, wherein either:
N is equal to 5, M is equal to 5, and J is equal to 4; or
N is equal to 6, M is equal to 6, and J is equal to 4.

6. The system of claim 1, wherein the memory space includes a plurality of blocks of system level cache memory associated with a plurality of core processing units.

7. The system of claim 6, wherein the one or more processors are configured to:
divide both the memory controllers and the system level cache memory into a plurality of non-overlapping clusters;
assign memory addresses to the plurality of clusters; and
for at least one cluster, assign addresses of the memory space of the cluster to the plurality of M regions and map each of the plurality of N memory controllers to a subset of the plurality of M regions within the cluster.

8. The system of claim 7, wherein the one or more processors are configured to:
assign the memory addresses to the cluster using a power of two hashing algorithm; and
within the at least one cluster, determine to which system level cache blocks of the cluster the memory addresses are assigned using a non-power of two hashing algorithm.

9. The system of claim 7, wherein the one or more processors are configured to control a granularity of cluster alternation for address assignment among the plurality of clusters using address masking.

10. The system of claim 6, wherein the N memory controllers are included in a chip.

11. A method comprising:
assigning, by one or more processors, addresses of a memory space that is accessible for reading or writing data to a plurality of M regions, wherein M is an integer that is greater than one; and
mapping, by the one or more processors, each of a plurality of N memory controllers to a subset of the plurality of M regions, wherein N is an integer that is greater than one and is not a power of two, wherein each of the N memory controllers is mapped to multiple regions of the M regions and each of the M regions is mapped to multiple memory controllers of the N memory controllers.

12. The method of claim 11, wherein each subset of the plurality of M regions includes exactly J regions, wherein J is less than M and is a power of two.

13. The method of claim 12, wherein J is the largest value that is a power of two and that is less than M.

14. The method of claim 12, when more than one memory controller is mapped to each region of the plurality of M regions, and the same number of memory controllers are mapped to each region of the plurality of M regions.

15. The method of claim 12, wherein either:
N is equal to 5, M is equal to 5, and J is equal to 4; or
N is equal to 6, M is equal to 6, and J is equal to 4.

16. The method of claim 11, wherein assigning addresses of the memory space comprises assigning blocks of system level cache memory to the plurality of M regions.

17. The method of claim 16, further comprising:
dividing, by the one or more processors, both the memory controllers and the system level cache into a plurality of non-overlapping clusters;
assigning, by the one or more processors, the memory addresses to the plurality of clusters; and
for at least one cluster, assigning, by the one or more processors, addresses of the memory space of the cluster to the plurality of M regions and mapping each of the plurality of N memory controllers to a subset of the plurality of M regions within the cluster.

18. The method of claim 17, further comprising:
assigning, by the one or more processors, the memory addresses to the cluster using a power of two hashing algorithm; and
within the at least one cluster, determining, by the one or more processors, to which system level cache blocks of the cluster the memory addresses are assigned using a non-power of two hashing algorithm.

19. The method of claim 17, further comprising controlling, by the one or more processors, a granularity of cluster alternation for address assignment among the plurality of clusters using address masking.

20. The method of claim 17, further comprising controlling, by the one or more processors, a granularity of address assignments within cache of the memory space using address masking.

* * * * *